United States Patent

[11] 3,608,471

| [72] | Inventor | John C. Martin |
| | | Springfield, Ill. |
| [21] | Appl. No. | 58,927 |
| [22] | Filed | July 28, 1970 |
| [45] | Patented | Sept. 28, 1971 |
| [73] | Assignee | Bunn-O-Matic Corporation |
| | | Springfield, Ill. |

[54] SAFETY START SWITCH SYSTEM FOR COFFEE URN HAVING A SWING SPOUT
3 Claims, 3 Drawing Figs.

[52] U.S. Cl. ................................... 99/283,
99/291
[51] Int. Cl. .................................... A47j 31/00
[50] Field of Search ........................... 99/280,
281, 282, 283, 291, 298, 300, 307

[56] References Cited
UNITED STATES PATENTS

| 2,748,689 | 6/1956 | Rotman | 99/283 |
| 3,261,280 | 7/1966 | Kaplan | 99/283 |
| 3,347,150 | 10/1967 | Hrabe | 99/283 |
| 3,517,603 | 6/1970 | Bruenjes | 99/283 |

*Primary Examiner*—Robert W. Jenkins
*Attorney*—Robert R. Lockwood

ABSTRACT: In order to encourage inspection of the position of a swing spout of a coffee urn to observe whether it is in position to discharge hot water into one or the other of a pair of coffeemaking receptacles, two series connected start switches are located on opposite sides of the swing spout, require simultaneous closure to start a pump to supply hot water to the swing spout, and are closed by the use of both hands of the operator.

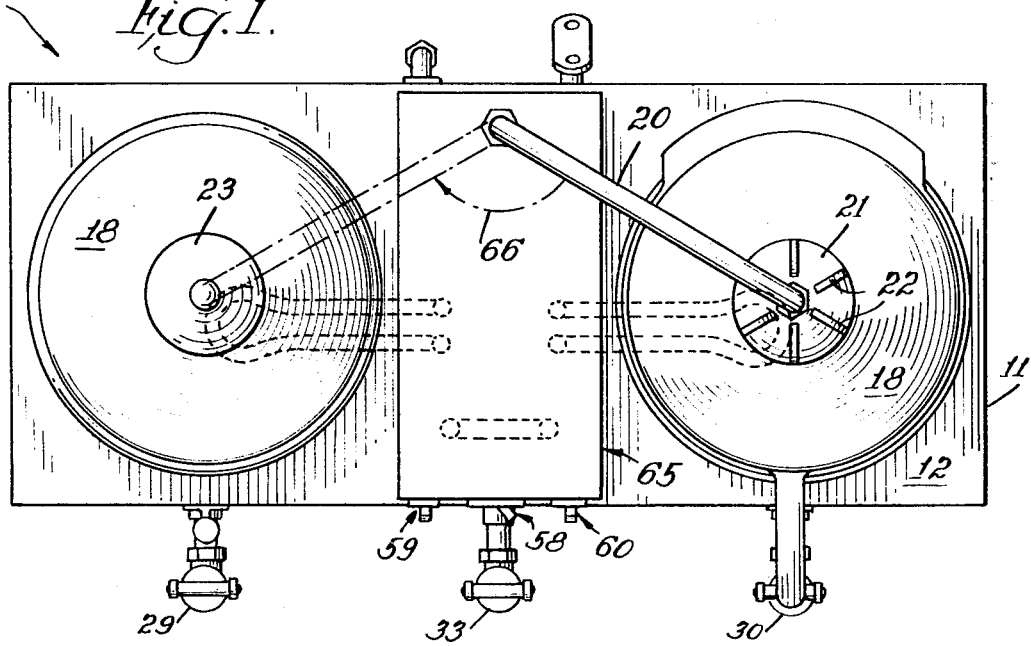
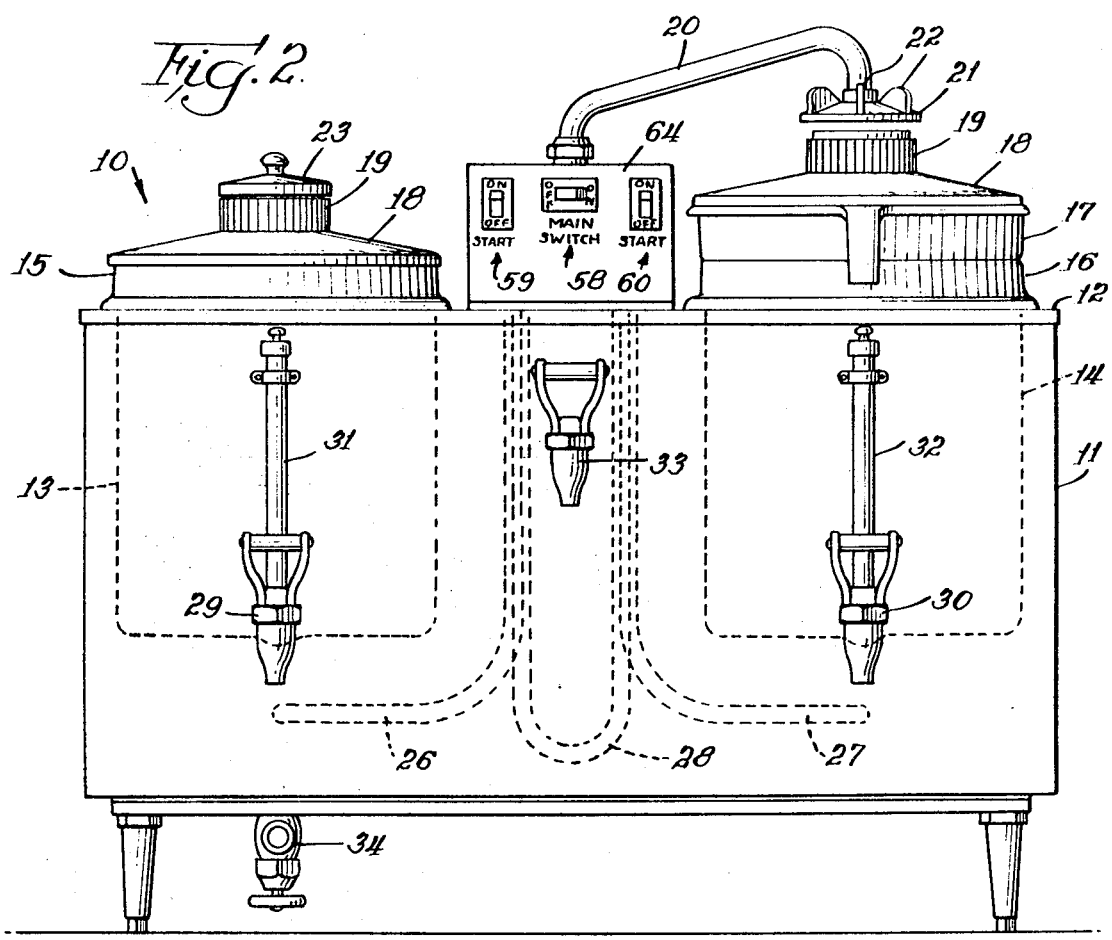

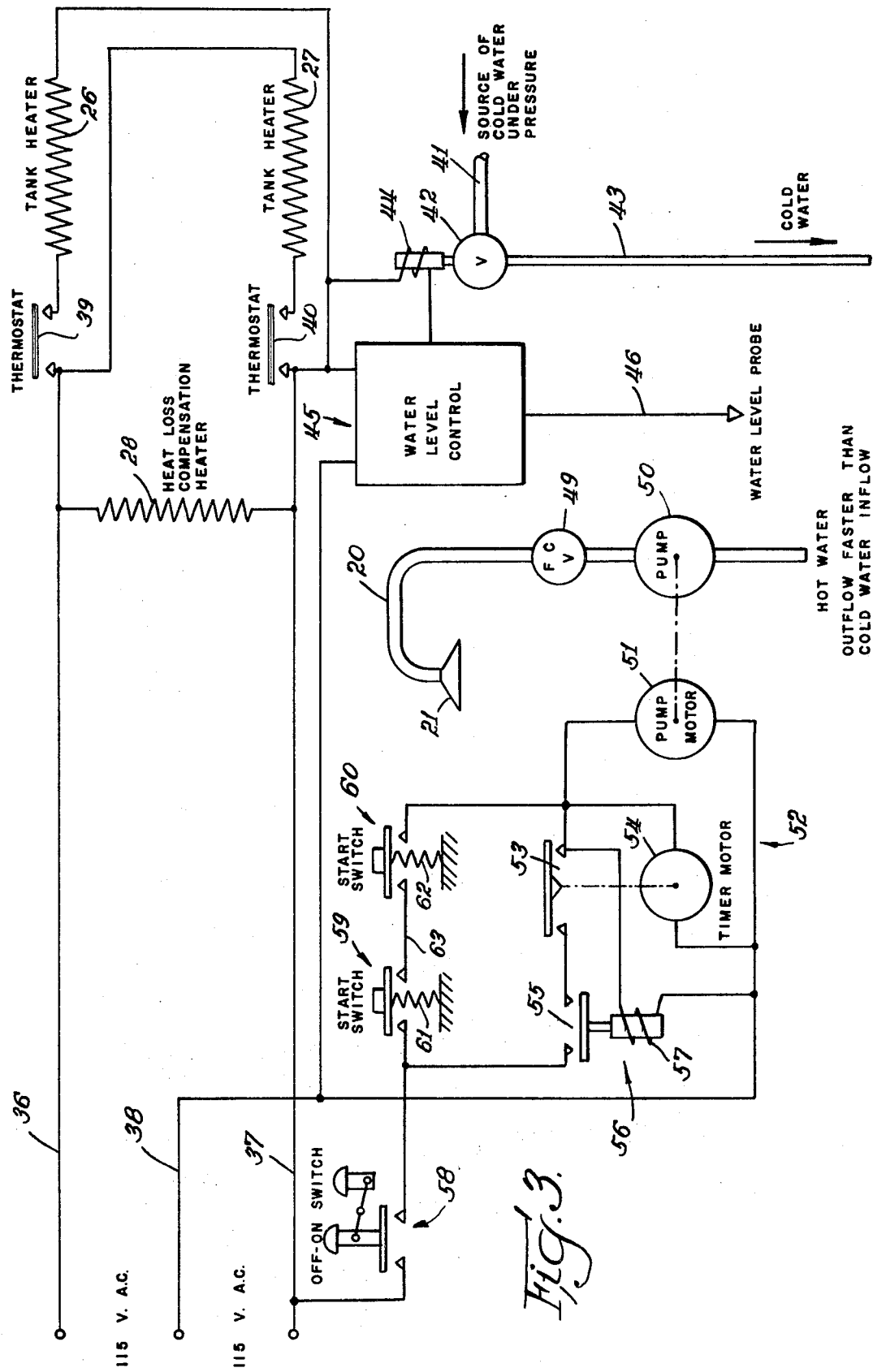

SAFETY START SWITCH SYSTEM FOR COFFEE URN HAVING A SWING SPOUT

This invention is an improvement over the urn-type coffee brewer disclosed in Martin and Rescho application Ser. No. 3,013, filed Jan. 15, 1970.

The coffeemaking urn disclosed in the above application employs a swing spout to deliver hot water to one or the other of a pair of coffeemaking receptacles. The hot water is supplied to the swing spout by a motor driven pump. If the swing spout is left in an intermediate position between the receptacles and the pump is started, hot water will be delivered over the top and sides of the urn and may cause inconvenience to operating personnel.

Among the objects of this invention are: To cause inspection of the position of the swing spout of a coffeemaking urn to insure that it is in operative position over one or the other of the pair of coffeemaking receptacles prior to starting a pump to deliver hot water to the swing spout; for this purpose to provide a pair of series-connected start switches both of which must be closed simultaneously to energize a motor that drives the pump; and to locate the start switches on opposite sides of the swing spout for operation by both hands of the operator whose attention then should be directed to observing the position of the swing spout.

In the drawings:

FIG. 1 is a top plan view of an urn-type coffee brewer embodying this invention.

FIG. 2 is a view, in front elevation, of the coffee shown in FIG. 1.

FIG. 3 shows, diagramatically, the circuit connections that are employed for the coffee brewer disclosed in FIGS. 1 and 2.

In FIGS. 1 and 2 the reference character 10 designates, generally, an urn-type coffee brewer that is constructed generally as described in the application above referred to. The coffee brewer 10 includes a hot water tank 11 having a cover 12 on which coffee extract receptacles 13 and 14 are mounted and depend into the hot water tank 11 which is arranged to be filled with water that is maintained at a relatively high temperature. Plastic covers 15 and 16 overlie the upper ends of the receptacles 13 and 14. A plastic funnel 17 is located in the plastic cover 16 that surmounts the receptacle 14. It is arranged to receive a paper filter on which a quantity of ground coffee is placed. For coffeemaking purposes hot water is sprayed over the ground coffee and coffee extract flows downwardly in to the receptacle 14. Overlying the plastic funnel 17 is a plastic funnel cover 18 which has a central upstanding cup-shaped formation 19 that is arranged to receive hot water from a swing spout 20 which is suitably pivotally mounted to the rear of the coffee brewer 10 as shown in FIG. 1. The swing spout 20 terminates in a sanitary plastic cover 21 having upstanding flanges 22 to facilitate shifting the swing spout 20 from the position shown in FIG. 1 to the alternate position shown by broken lines in to overlying relation to the receptacle 13.

It will be observed that the plastic cover 15 has a plastic funnel cover 18 applied thereto with a sanitary plastic cover 23 overlying the upper open end of the cup-shaped formation 19.

As shown in FIG. 2 tank heaters 26 and 27 are employed in the tank 11 and provision is made, as will appear hereinafter, for energizing the heaters 26 and 27 from a suitable current source to maintain the water in the tank 11 at a predetermined temperature. In addition there is a heat loss compensation heater 28 in the tank 11 which is energized and, as the name implies, is arranged to compensate for heat loss from the tank 11.

Coffee extract can be withdrawn from the receptacles 13 and 14 by operation of coffee extract faucets 29 and 30. Associated with them are sight glasses 31 and 32 for the purpose of indicating the level of the coffee extract in the receptacles 13 and 14. Hot water can be withdrawn from the tank 11 by a hot water faucet 33. A drain valve 34 at the bottom of the tank 11 provides for withdrawing the water from the tank 11 should this become necessary.

In FIG. 3 it will be noted that conductors 36 and 37 are arranged to be energized from a suitable alternating-current source at a voltage of the order of 115 volts above ground or neutral that is represented by conductor 38. Thermostats 39 and 40, responsive to the temperature of the water in the tank 11 serve to control energization of the tank heaters 26 and 27. The heat loss compensation heater 28 is connected between the conductors 36 and 37.

Cold water is supplied to the tank 11 through an inlet cold water pipe 41 to a solenoid valve 42 and flows through a discharge water pipe 43 into the lower part of the tank 11. Associated with the valve 42 is a winding 44 that is energized between conductors 37 and 38 in accordance with operation of a water level control device that is indicated, generally, at 45 and includes a water level probe 46 which is responsive to the surface level of the water in the tank 11.

Hot water from the tank 11 is supplied to the swing spout 20 through a flow control valve 49 by a pump 50 which is driven by a pump motor 51. For making a batch of coffee extract the hot water is supplied by the pump 50 during a predetermined interval. For this purpose a timer, indicated generally at 52, is employed. It includes normally open contacts 53 and a timer motor 54, which is arranged to open the contacts 53 a predetermined time after they have been closed. Connected in series with the contacts 53 are contacts 55 of a relay that is indicated, generally, at 56. The relay 56 includes a winding 57.

For effecting a preliminary energization of the control circuits for the pump motor 51 a main off-on switch, indicated generally at 58, is provided. One of its contacts is connected to the conductor 37.

Fore effecting the actual energization of the pump motor 51, the timer 52 and the relay 56 a pair of start switches 59 and 60 is provided. The switches 59 and 60 are single-pole single-throw switches and they are biased open by springs 61 and 62. The contacts of the start switches 59 and 60 are connected in series circuit relation by conductor 63. Thus, after the main switch 58 has been closed, it is necessary to simultaneously close both start switches 59 and 60 to complete an energizing circuit from the conductor 37 to the pump motor 51 and to the neutral conductor 38. At the same time timer motor 54 is connected in parallel with the pump motor 51 and its contacts 53 are closed. Also winding 57 is connected in parallel with the pump motor 51 and timer motor 54 and its contacts 55 are closed. This arrangement provide a holding circuit which permits the release of the start switches 59 and 60. At the end of the time for which the timer 52 is set, contacts 53 are opened and the energizing circuit for pump motor 51 which had been maintained through contacts 53 and 55 is opened and further operation of the pump 50 ceases. Also winding 57 is deenergized and contacts 55 are opened.

Referring the FIG. 2 it will be observed that the start switches 59 and 60 are located on a panel 64 which is located at the front of an equipment housing that is indicated, generally, at 65 in FIG. 1. The main switch 58 is located between the start switches 59 and 60.

It will be observed that the start switches 59 and 60 are positioned on opposite sides of the swing spout 20 which is arranged to be shifted as indicated by arrow 66 from its position shown by full lines in FIG. 1 to the alternate position shown by broken lines. Since the start switches must be operated simultaneously by the operator and since they are spaced a substantial distance apart it is more convenient for the operator to use both hands to close the start switches 59 and 60. When this is done the operator is quite likely to observe the position of the swing spout 20 and to note whether it is in operative position over one or the other of the coffee extract receptacles 13 and 14. Because two start switches 59 and 60 are employed, the pump 50 cannot be started accidentally by the operation of only a single start switch, such as might occur while cleaning the front of the urn 16 or possibly bumping into it while in an aisleway, etc.

What is claimed as new is:

1. Coffeemaking apparatus comprising:
   a tank for containing hot water, a pair of coffeemaking receptacles in said tank,
a funnel on one of said receptacles for receiving ground coffee,
a swing spout for supplying hot water to one or the other of said coffeemaking receptacles,
a pump for delivering hot water from said tank to said swing spout,
an electric motor for driving said pump,
a pair of series-connected start switches from connecting said motor for energization to a current source, and
means for maintaining said motor energized for a predetermined time after opening of said start switches.

2. Coffeemaking apparatus according to claim 1 wherein said start switches are single-pole single-throw switches, are biased to open position, and both are required to be held closed simultaneously to energize said pump motor.

3. Coffeemaking apparatus according to claim 2 wherein said start switches are spaced apart on opposite sides of said swing spout and both hands of an operator are used to close them.